US011625538B2

(12) United States Patent
Adiga et al.

(10) Patent No.: US 11,625,538 B2
(45) Date of Patent: Apr. 11, 2023

(54) METHODS AND SYSTEMS FOR AUTOMATIC EXTRACTION OF SELF-REPORTED ACTIVITIES OF AN INDIVIDUAL

(71) Applicant: Tata Consultancy Services Limited, Mumbai (IN)

(72) Inventors: Deepa Adiga, Pune (IN); Maitry Bhavsar, Pune (IN); Mayuri Duggirala, Pune (IN); Sachin Patel, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 290 days.

(21) Appl. No.: 17/036,254

(22) Filed: Sep. 29, 2020

(65) Prior Publication Data
US 2021/0216909 A1      Jul. 15, 2021

(30) Foreign Application Priority Data
Jan. 13, 2020 (IN) .............................. 202021001547

(51) Int. Cl.
*G06F 40/30* (2020.01)
*G06N 20/00* (2019.01)
(Continued)

(52) U.S. Cl.
CPC .............. *G06F 40/30* (2020.01); *G06F 18/10* (2023.01); *G06F 18/254* (2023.01);
(Continued)

(58) Field of Classification Search
None
See application file for complete search history.

(56) References Cited

U.S. PATENT DOCUMENTS 8,190,628 B1 * 5/2012 Yang ..................... G06F 40/289
704/10
8,676,566 B2 3/2014 Myaeng et al.
(Continued)

FOREIGN PATENT DOCUMENTS

CN          104834747 A        8/2015

OTHER PUBLICATIONS

Argamon, Shlomo, Ido Dagan, and Yuval Krymolowski. "A memory-based approach to learning shallow natural language patterns." arXiv preprint cmp-lg/9806011 (1998). (Year: 1998).*
(Continued)

*Primary Examiner* — Frank D Mills
(74) *Attorney, Agent, or Firm* — Finnegan, Henderson, Farabow, Garrett & Dunner, LLP

(57) ABSTRACT

This disclosure relates generally to methods and systems for automatic extraction of self-reported activities of an individual from a freestyle narrative text. Manual extraction of such self-reported activities of the individual from the freestyle narrative text over the period of time is a complex task and consume a significant amount of time. The present systems and methods utilize a predefined grammar pattern and a natural language processing technique to generate one or more candidate activity phrases, from the pre-processed input text posted by the individual. A deep learning based supervised classification model is utilized to automatically extract the one or more self-reported activities of the individual, from the one or more candidate activity phrases. Manual intervention and efforts of analyzing the freestyle narrative text to extract the self-reported activities are avoided. Longitudinal assessment of the self-reported activities may reveal routines and behavior of the individual.

15 Claims, 4 Drawing Sheets

(51) Int. Cl.
- *G06F 40/253* (2020.01)
- *G06F 40/284* (2020.01)
- *G06F 40/268* (2020.01)
- *G06F 18/10* (2023.01)
- *G06F 18/25* (2023.01)

(52) U.S. Cl.
CPC .......... *G06F 40/253* (2020.01); *G06F 40/268* (2020.01); *G06F 40/284* (2020.01); *G06N 20/00* (2019.01)

(56) References Cited

U.S. PATENT DOCUMENTS

| | | | |
|---|---|---|---|
| 10,754,883 B1* | 8/2020 | Kannu | G06F 16/36 |
| 2017/0199866 A1* | 7/2017 | Gunaratna | G06F 40/284 |
| 2018/0293978 A1* | 10/2018 | Sinha | G06F 40/232 |
| 2018/0365209 A1 | 12/2018 | Wang | |
| 2018/0365222 A1* | 12/2018 | Peranandam | G06F 40/289 |
| 2019/0155944 A1 | 5/2019 | Mahata et al. | |
| 2019/0205839 A1* | 7/2019 | Dotan-Cohen | H04L 67/535 |
| 2019/0294670 A1* | 9/2019 | Jagan | G06F 40/30 |

OTHER PUBLICATIONS

Jlailaty, Diana, Daniela Grigori, and Khalid Belhajjame. "Mining business process activities from email logs." In 2017 IEEE International Conference on Cognitive Computing (ICCC), pp. 112-119. IEEE, 2017. (Year: 2017).*

Wang, Qihua, Hongxia Jin, and Yan Liu. "Collaboration analytics: mining work patterns from collaboration activities." In Proceedings of the 19th ACM international conference on Information and knowledge management, pp. 1861-1864. 2010. (Year: 2010).*

* cited by examiner

METHODS AND SYSTEMS FOR AUTOMATIC EXTRACTION OF SELF-REPORTED ACTIVITIES OF AN INDIVIDUAL

PRIORITY CLAIM

This U.S. patent application claims priority under 35 U.S.C. § 119 to: Indian Patent Application No. 202021001547, filed on 13 Jan. 2020. The entire contents of the aforementioned application are incorporated herein by reference.

TECHNICAL FIELD

The disclosure herein generally relates to the field of text classification, and, more particularly, to methods and systems for automatic extraction of self-reported activities of an individual from a freestyle narrative text.

BACKGROUND

Individuals may express their opinions and routines themselves in freestyle narrative text, through various media communities and networking platforms such as daily journals, blogs, diaries, social media, professional networks, and chat bot conversations. The freestyle narrative text may include self-reported activities and referred activities. The self-reported activities are those performed or to be performed by the individual. The referred activities are those, which do not belong to the individual, but the individual expresses his/her opinion over such activities in the freestyle narrative text. Analyzing such self-reported activities from the freestyle narrative text over a period of time may lead to discover interesting insights of the individual.

Conventional solutions for extracting the self-reported activities involve manual searching, analyzing the freestyle narrative text. Manually analyzing freestyle narrative text includes analyzing each paragraph and each sentence, comprehending each paragraph and each sentence, distinguishing the self-reported activities from all the activities, then manual listing and maintaining of such activities and so on. So manually analyzing such freestyle narrative text for extracting the self-reported activities, is a complex and time-consuming task. The user needs to spend significantly more amount of time, if a long list of freestyle narrative texts posted by the individual over the period of time to be analyzed. The manual analysis sometimes may undergo human bias (human error) of selecting favorite activities, skipping low interest activities and so on.

SUMMARY

Embodiments of the present disclosure present technological improvements as solutions to one or more of the above-mentioned technical problems recognized by the inventors in conventional systems. For example, in one embodiment, a processor-implemented method for automatic extraction of self-reported activities of an individual is provided. The method comprising the steps of: continuously obtaining, via one or more hardware processors, a self-reported input text of the individual, from one or more entities, at predefined intervals; pre-processing, via the one or more hardware processors, the self-reported input text to obtain a pre-processed input text; generating, via the one or more hardware processors, one or more candidate activity phrases, in each sentence from the pre-processed input text, based on a predefined grammar pattern, using a natural language processing technique, wherein each candidate activity phrase of the one or more candidate activity phrases, comprises one or more words present consecutively in the pre-processed input text; identifying, via the one or more hardware processors, a set of context tokens for each candidate activity phrase, wherein the set of context tokens comprises associated left context tokens and associated right context tokens, wherein the associated left context tokens are a predefined number of words present immediately left to the associated candidate activity phrase of a sentence present in the pre-processed input text, and wherein the associated right context tokens are the predefined number of words present immediately right to the associated candidate activity phrase of the sentence present in the pre-processed input text; obtaining, via the one or more hardware processors, an associated activity phrase tokens array for each candidate activity phrase and an associated context tokens array for each candidate activity phrase, using a supervised classification model; determining, via the one or more hardware processors, a relation between the associated activity phrase tokens array and the associated context tokens array for each candidate activity phrase, using the supervised classification model, wherein the relation is determined based on an activity phrase grammar-pattern of the associated activity phrase tokens array and a context grammar-pattern of the associated context tokens array; classifying, via the one or more hardware processors, each candidate activity phrase of the one or more candidate activity phrases, as a self-reported activity or a referred activity, using the supervised classification model, based on the determined relation; and automatically extracting, via the one or more hardware processors, the one or more self-reported activities of the individual, using the supervised classification model, based on the classification.

In another aspect, a system for automatic extraction of self-reported activities of an individual is provided. The system comprising: a memory storing instructions; one or more communication interfaces; and one or more hardware processors coupled to the memory via the one or more communication interfaces, wherein the one or more hardware processors are configured by the instructions to: continuously obtain a self-reported input text of the individual, from one or more entities, at predefined intervals; pre-process the self-reported input text to obtain a pre-processed input text; generate one or more candidate activity phrases, in each sentence from the pre-processed input text, based on a predefined grammar pattern, using a natural language processing technique, wherein each candidate activity phrase of the one or more candidate activity phrases, comprises one or more words present consecutively in the pre-processed input text; identify a set of context tokens for each candidate activity phrase, wherein the set of context tokens comprises associated left context tokens and associated right context tokens, wherein the associated left context tokens are a predefined number of words present immediately left to the associated candidate activity phrase of a sentence present in the pre-processed input text, and wherein the associated right context tokens are the predefined number of words present immediately right to the associated candidate activity phrase of the sentence present in the pre-processed input text; obtain an associated activity phrase tokens array for each candidate activity phrase and an associated context tokens array for each candidate activity phrase, using a supervised classification model; determine a relation between the associated activity phrase tokens array and the associated context tokens array for each candidate activity phrase, using the supervised classification model, wherein the relation is determined based on an activity phrase grammar-pattern of the associated activity phrase tokens array and a context grammar-pattern of the associated context tokens array; classify each candidate activity phrase of the one or more candidate activity phrases, as a self-reported activity or a referred activity, using the supervised classification model, based on the determined relation; and automatically extract the one or more self-reported activities of the individual, using the supervised classification model, based on the classification.

In yet another aspect, there is provided a computer program product comprising a non-transitory computer readable medium having a computer readable program embodied therein, wherein the computer readable program, when executed on a computing device, causes the computing device to: continuously obtain a self-reported input text of the individual, from one or more entities, at predefined intervals; pre-process the self-reported input text to obtain a pre-processed input text; generate one or more candidate activity phrases, in each sentence from the pre-processed input text, based on a predefined grammar pattern, using a natural language processing technique, wherein each candidate activity phrase of the one or more candidate activity phrases, comprises one or more words present consecutively in the pre-processed input text; identify a set of context tokens for each candidate activity phrase, wherein the set of context tokens comprises associated left context tokens and associated right context tokens, wherein the associated left context tokens are a predefined number of words present immediately left to the associated candidate activity phrase of a sentence present in the pre-processed input text, and wherein the associated right context tokens are the predefined number of words present immediately right to the associated candidate activity phrase of the sentence present in the pre-processed input text; obtain an associated activity phrase tokens array for each candidate activity phrase and an associated context tokens array for each candidate activity phrase, using a supervised classification model; determine a relation between the associated activity phrase tokens array and the associated context tokens array for each candidate activity phrase, using the supervised classification model, wherein the relation is determined based on an activity phrase grammar-pattern of the associated activity phrase tokens array and a context grammar-pattern of the associated context tokens array; classify each candidate activity phrase of the one or more candidate activity phrases, as a self-reported activity or a referred activity, using the supervised classification model, based on the determined relation; and automatically extract the one or more self-reported activities of the individual, using the supervised classification model, based on the classification.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
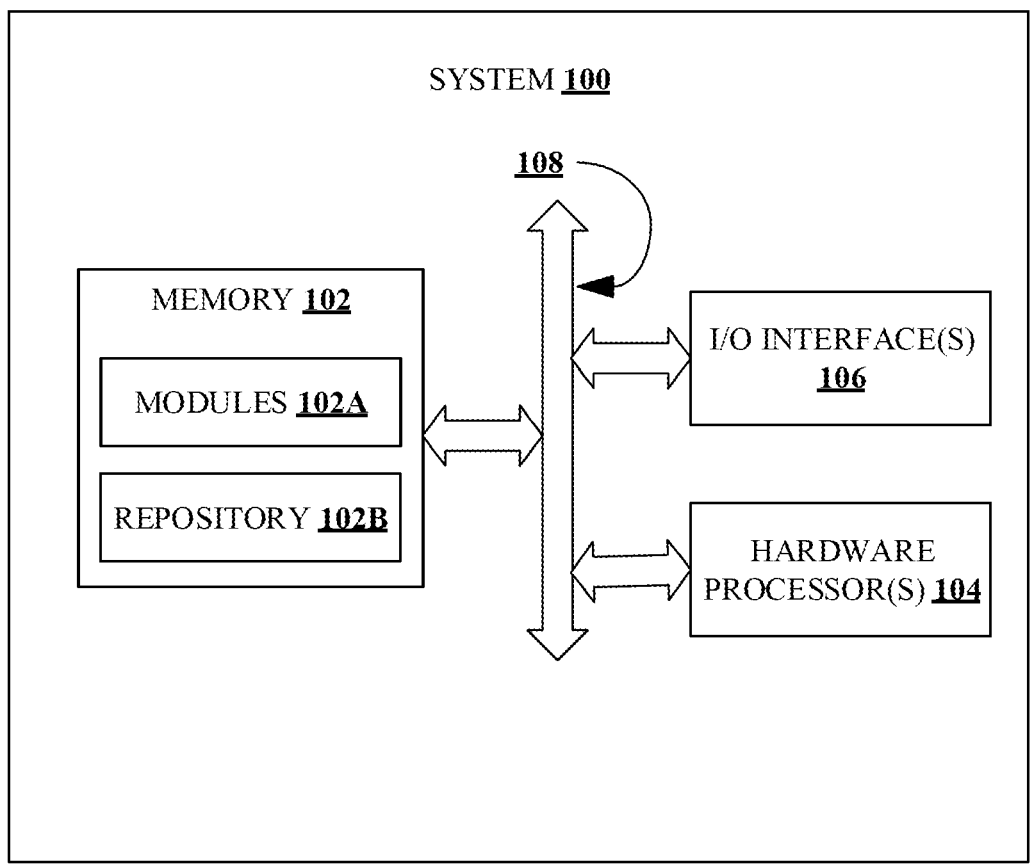
FIG. 1 is a functional block diagram of a system for automatic extraction of self-reported activities of an individual, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Media communities and networking platforms such as daily journals, blogs, diaries, social media, professional networks, and chat bot conversations are some of the mediums through which individuals may express their opinions and share their routines. The individuals may discuss or post their hobbies, interests, health issues that they might have faced, synergy with their family and friends, and many other personal aspects of their life.

The individuals may express their opinions and routines themselves through these mediums in freestyle narratives. These freestyle narratives may be expressed in a text format, and include short or long paragraphs, short or long sentences, simple or complex words, or may be in a story form, based on language skills of the individuals. In addition, the individuals may use trending short forms such as hashtags, emoticons, symbols, punctuation and so on to express better in these freestyle narratives. With such narrative texts, the individuals aim to connect and extend conversations with readers. These freestyle narrative texts may provide reflections of everyday activities of the individuals. These activities are engaging tasks may be related to health, personal life, work, habits, interests, friends, relations, and so on, that the individual performed or to be performed in a day.

The freestyle narrative text may include self-reported activities and referred activities. The self-reported activities are those performed or to be performed by the individual. The referred activities are those that do not belongs to the individual but he/she expresses his/her opinion over such activities in the freestyle narrative text. Analyzing such self-reported activities from the freestyle narrative text over a period of time may lead to discover interesting insights of the individual.

The insights of the individual may be related to his/her personality type, state of mind, interests or hobbies, lifestyle preferences including active or sedentary, personal and professional life hitches, achievements or joyous moments, unpleasant experiences, relationship issues, and so on. Such analysis may help uncover physical or mental health problems such as stress, imbalanced life style, bad health conditions, poor habits and preferences, and so on of the individual. Further, this analysis may help to improve well-being of the individual by taking appropriate measures. However, manual extraction of such self-reported activities of the individual from the freestyle narrative text over the period of time is a complex task and consume a significant amount of time.

Various embodiments disclosed herein provide methods and systems for automatic extraction of self-reported activities of the individual, solves the problems of automatically extracting the self-reported activities of the individual from the freestyle narrative text posted over the period of time. Also, the disclosed methods and systems automatically extract the self-reported activities without consuming much time. The present disclosure utilizes a predefined grammar pattern and a natural language processing technique to generate one or more candidate activity phrases, from the pre-processed input text posted by the individual. A deep learning based supervised classification model is utilized to automatically extract the one or more self-reported activities of the individual, from the one or more candidate activity phrases.

Figure 2A:
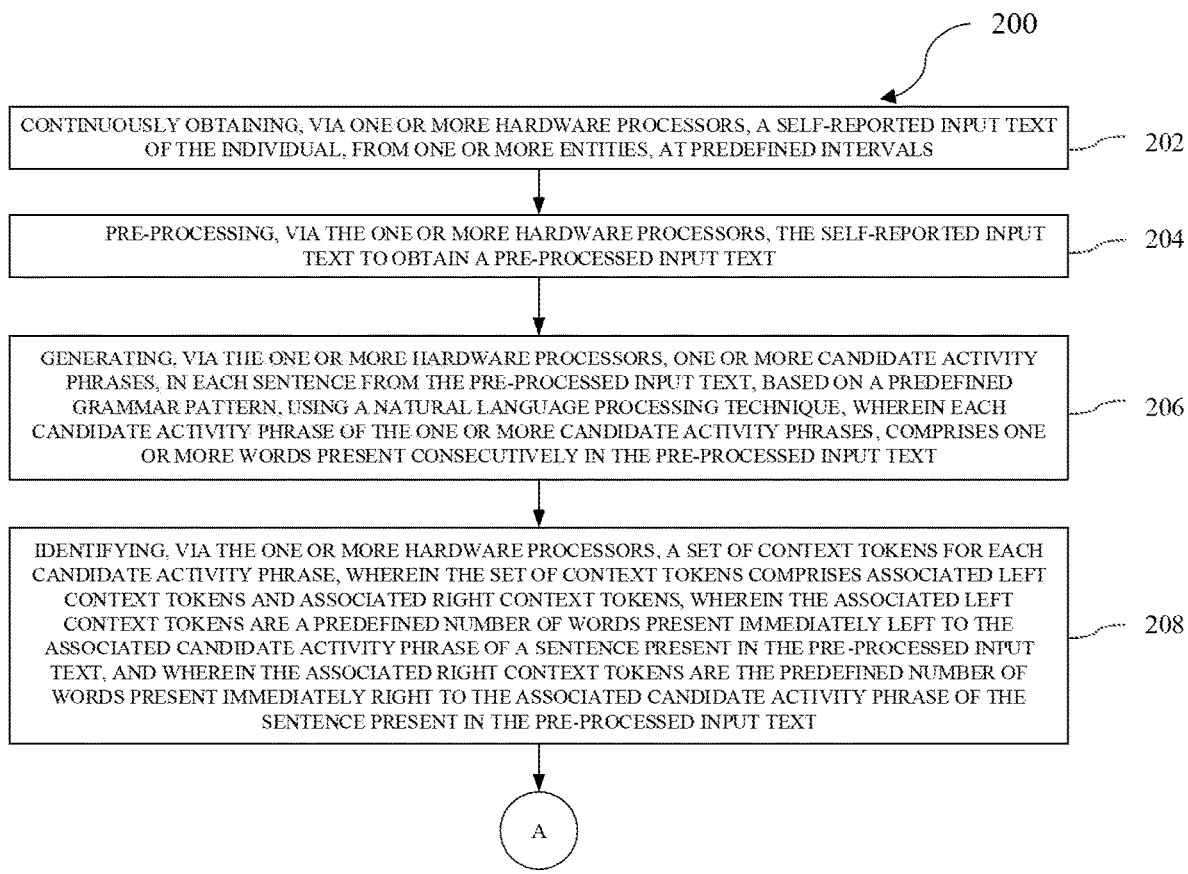
FIG. 2A illustrates a first part of an exemplary flow diagram of a processor-implemented method for automatic extraction of the self-reported activities of the individual, according to some embodiments of the present disclosure.
Figure 2B:
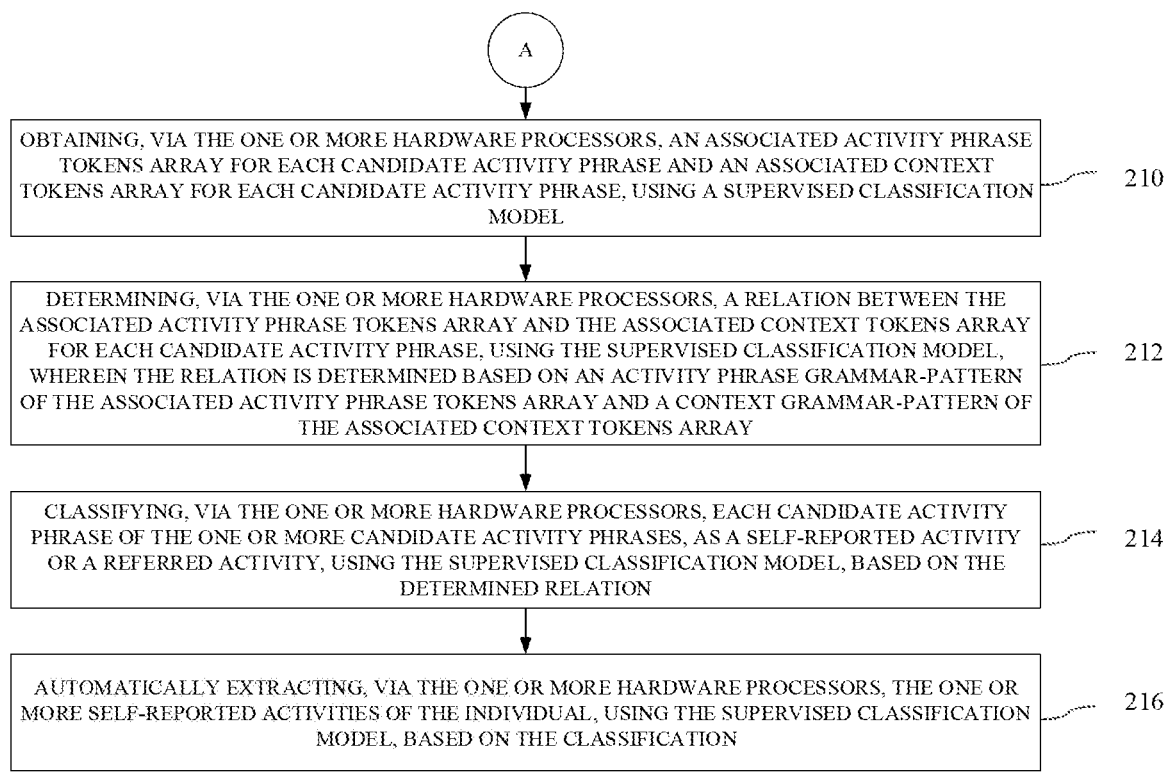
FIG. 2B illustrates a second part of an exemplary flow diagram of a processor-implemented method for automatic extraction of the self-reported activities of the individual, according to some embodiments of the present disclosure.
Figure 3:
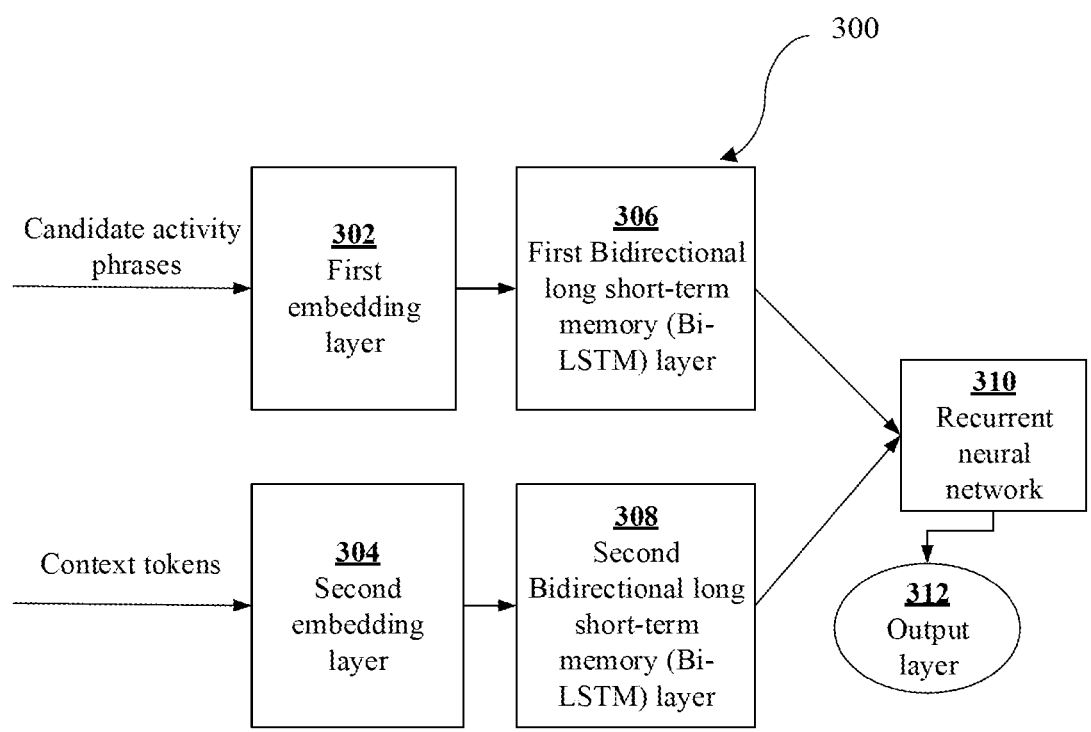
FIG. 3 is a functional block diagram of a supervised classification model for automatic extraction of the self-reported activities of the individual, according to some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary systems and/or methods.

FIG. 1 is a functional block diagram of a system for automatic extraction of self-reported activities of an individual, according to some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102A and a repository 102B for storing data processed, received, and generated by one or more of the plurality of modules 102A. The plurality of modules 102A may include routines, programs, objects, components, data structures, and so on, which perform particular tasks or implement particular abstract data types.

The plurality of modules 102A may include programs or computer-readable instructions or coded instructions that supplement applications or functions performed by the system 100. The plurality of modules 102A may also be used as, signal processor(s), state machine(s), logic circuitries, and/or any other device or component that manipulates signals based on operational instructions. Further, the plurality of modules 102A can be used by hardware, by computer-readable instructions executed by the one or more hardware processors 104, or by a combination thereof. In an embodiment, the plurality of modules 102A can include various sub-modules (not shown in FIG. 1). Further, the memory 102 may comprise information pertaining to input(s)/output(s) of each step performed by the processor(s) 104 of the system 100 and methods of the present disclosure. Further, the repository 102B amongst other things, may serve as a database for storing the data that is processed, received, or generated as a result of the execution of the plurality of modules 102A.

Although the repository 102B is shown internal to the system 100, it will be noted that, in alternate embodiments, the repository 102B can also be implemented external to the system 100, where the repository 102B may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102B may be distributed between the system 100 and the external database.

Referring to FIG. 2, components and functionalities of the system 100 are described in accordance with an example embodiment of the present disclosure. FIG. 2 illustrates an exemplary flow diagram of a processor-implemented method 200 for automatic extraction of the self-reported activities of the individual, according to some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously.

At step 202 of the method 200, the one or more hardware processors 104 of the system 100 are configured to continuously obtain a self-reported input text of the individual, from one or more entities, at predefined intervals. In an embodiment, the self-reported input text is obtained by combining one or more input text instances posted by the individual in one entity. In another embodiment, the self-reported input text is obtained by combining one or more input text instances posted by the individual in the one or more entities.

In an embodiment, the entity or, one or more entities include but are not limited to media communities and networking platforms such as daily journals, blogs, diaries, chat bot conversations, social media communities and platforms such as Facebook, twitter, professional networking platforms such as LinkedIn, messenger platforms such as WhatsApp, organization specific networking platforms comprising messengers, chatbots and so on. In an embodiment, the organization specific networking platforms include social networking platforms and professional networking platforms maintained by the associated organizations. In an embodiment, the organizations may use respective networking platforms for their own employees and customers or for any external organizations.

In an embodiment, the predefined intervals may be for a set of minutes, hours, or days. For example, the predefined interval may be for 24 hours. That means, the one or more input text instances posted by the individual in the one or more entities, for every 24 hours, are combined to obtain the self-reported input text. In an embodiment, the individual may include but or not limited to a user, a customer, an employee or any person, who is registered with the one or more entities to post their day to day activities, opinions, routines, updates, future or to-do activities, experiences and so on.

The following exemplary self-reported input text is considered for explaining further steps of the present disclosure. The exemplary self-reported input text is: 'Checking lunch time on monitor then will have a cigarette. After that will complete a few works. Meanwhile have #smokingsession. Planning to try out idea I thought of http://www.iitb.ac.in/. Hope it will give me good results. Evening, I plan to twitter bootstrap defaults and to play a completely new instrument, Yaay! Also, I want to date women my own age very soon @blushmered. :-)!'. From the above exemplary self-reported input text, it may be observed that the individual or the user posted the activities to be performed and expected results.

In an embodiment, the individual may generally prefer to express in different styles such as hashtags, emoticons, words with repeated characters and so on. The postings with different styles sometimes may not add any value to the words and sometimes need to replace these styles with suitable words.

At step 204 of the method 200, the one or more hardware processors 104 of the system 100 are configured to pre-process the self-reported input text to obtain a pre-processed input text. In an embodiment, pre-process the self-reported input text includes removing one or more special characters present in the self-reported input text, and handling one or more characteristics associated with one or more words present in the self-reported input text.

In an embodiment, removing one or more special characters present in the self-reported input text includes removing the special characters such as '@', '#' or hashtags, or any other special characters that do not add value to the words present in the self-reported input text. In the above provided exemplary self-reported input text, the hashtag is present to the word 'smokingsession' which does not add any value. Similarly, the special character '@' is present for the word 'blushmered' does not really add any value. Removing one or more special characters present in the self-reported input text further include removing of websites and weblinks associated with the words present in the self-reported input text. In the above provided exemplary self-reported input text, the website 'http://www.iitb.ac.in/' may be removed as it does not provide much value to the associated sentence ('Planning to try out idea I thought of').

In an embodiment, handling one or more characteristics associated with one or more words present in the self-reported input text includes replacing some special characters such as emoticons, with the suitable words, removal of special characters such as RT (registered trademarks) associated with the words, replacing words comprising repeated characters (such as 'yaay', 'hurraayyy', 'yess' and so on) with the meaningful words ('yay', 'huray', 'yes'), or handling any other special characters that do not have a standard meaning. In the above provided exemplary self-reported input text, the emoticon ':-)' is present which is to be replaced with suitable word (i.e., 'happy'). Similarly, repeated characters are present in the word 'Yaay' which to be replaced with suitable word (i.e, 'yay' or 'yes'). Likewise, the word 'blushmered' may be removed as it does not provide any value to the activity involved.

In an embodiment, the exemplary pre-processed input text after pre-processing the above exemplary self-reported input text may look like: 'Checking lunch time on monitor then will have a cigarette. After that will complete a few works. Meanwhile have smoking session. Planning to try out idea I thought of. Hope it will give me good results. Evening, I plan to twitter bootstrap defaults and to play a completely new instrument, Yay! Also, I want to date women my own age very soon happy'.

At step 206 of the method 200, the one or more hardware processors 104 of the system 100 are configured to generate one or more candidate activity phrases in each sentence from the pre-processed input text. Each candidate activity phrase of the one or more candidate activity phrases, includes one or more words present consecutively in the pre-processed input text. In an embodiment, the one or more candidate activity phrases are generated from the pre-processed input text, based on a predefined grammar pattern, using a natural language processing technique. Each candidate activity phrase is a collection of words that may represent any ongoing, planned in future or already executed (or completed) activities. Each candidate activity phrase refers to a potential phrase that represent the activity present in the pre-processed input text.

In an embodiment, the predefined grammar pattern is constructed based on part-of-speech tagging (POSTAG) sub-patterns, using the natural language processing technique. The part-of-speech tagging (POSTAG) sub-patterns denotes a context and a definition of each word present in a sentence having a combination of one or more verbs, adverbs, nouns, adjectives and prepositions, in the language grammar (in this case: English).

In an embodiment, the part-of-speech tagging (POSTAG) sub-patterns are formed based on the below mentioned three facts and observations of the activity phrases in the natural language processing and accordingly respective POSTAG sub-patterns are generated using the language grammar:

1. Most of activity phrases begin with a verb describing certain activity. The verb may be associated with supportive verb to add details to the activity.
   POSTAG sub-patterns for verb and supportive verb are expressed below:
   Verb="<VB|VBD|VBG|VBN|VBP|VBZ>?<RP>?"
   SupportiveVerb="<VB|VBD|VBG>?<RP>?"

2. (A) Activity phrases may have one or more noun, naming the act to be performed. Each noun phrase may be a combination of at least one of: determiner, adverb, adjective and one or more nouns. POSTAG sub-pattern for 2 (A) is expressed below:
   Nounph1="<DT|PDT>?<PRP\$>?<RB|RBR|RBS>?<PRP\$>?<JJ|JJS|JJR>?<CD>?<NN|NNS|NNP|NNPS>+"

(B) Activity phrases may also include adjectives describing one or more nouns with one or more conjunctions. POSTAG sub-pattern for 2 (B) is expressed below:
   Nounph2="(<CC><DT|PDT>?<NN|NNS|NNP|NNPS>+)?"

3. Activity phrases may include one or more prepositions adding to: where, when, with whom, in, etc. details to the activity.
   POSTAG sub-pattern for prepositions is expressed below:
   Prep="<TO|IN>?"

The predefined grammar pattern is constructed in a form of a regular expression, based on the respective POSTAG sub-patterns generated for the above mentioned three facts and observations of the activity phrases in the natural language processing. In an embodiment, the regular expression for the predefined grammar pattern is mentioned below:
   Predefined grammar pattern="NP1: {%s%s%s%s%s(%s%s%s)?}" %(Verb, Prep, SupportiveVerb, Nounph1, Nounph2, Prep, Nounph1, Nounph2)
   where NP1 represents a natural language processing pattern, and each % s represents a string of respective POSTAG sub-pattern for the above mentioned three facts and observations of the activity phrases.

In an embodiment, one or more candidate words denoting one of verbs, adverbs, supportive verbs, nouns, adjectives and prepositions, present in the pre-processed input text, using the natural language processing technique. Then, the identified one or more candidate words are mapped to the predefined grammar pattern to generate the one or more candidate activity phrases in each sentence from the pre-processed input text. Each candidate activity phrase of the one or more candidate activity phrases comprises the identified one or more candidate words. In an embodiment, the generated one or more candidate activity phrases are stored in a candidate activity phrases (CAP) repository that is present in the repository 102B of the system 100.

A pseudo code for the mapping of the identified one or more candidate words present in the pre-processed input text with the predefined grammar pattern, to generate the one or more candidate activity phrases, is mentioned below:
   For every sentence S in the pre-processed input text, do:
   Postag the sentence S
      If activity phrase grammar matches a set of Postags in the sentence S:
         select a set of words of respective matching Postags as candidate activity phrase
         store candidate activity phrases in the CAP repository
   End
   End Below table.1 shows the generated candidate activity phrases for the above mentioned exemplary pre-processed input text after applying the above-mentioned pseudo code on the exemplary pre-processed input text (by mapping with the above mentioned predefined grammar pattern) along with associated POSTAG patterns:

TABLE 1

| Sr. No | Candidate activity phrase | POSTAG pattern |
| --- | --- | --- |
| 1 | Checking lunch time on monitor | VBG NN NN IN NN |
| 2 | have a cigarette | VB DT NN |
| 3 | complete a few works | VB DT JJ NNS |
| 4 | have smoking session | VBP NN NN |
| 5 | To try out idea | TO VB RP NN |
| 6 | good results | JJ NNS |
| 7 | plan to twitter bootstrap defaults | VBP TO VB JJ NNS |
| 8 | to play a completely new instrument | TO VB DT RB JJ NN |
| 9 | want to date women my own age | NN NNS PRP$ JJ NN |
| 10 | my own age | PRP JJ NN |

Each candidate activity phrase out of the one or more candidate activity phrases may be one of (i) a self-reported activity, and (ii) a referred activity. It may be noted that the self-reported activity refers to the activity performed or to be performed by the individual and the referred activity refers to the activity do not belong to the individual. In other words, the referred activity is not a self-reported activity. A number of activities and a number of activities generated are based on the self-reported input text posted by the individual in the one or more entities. From table 1, the candidate activity phrase listed under Sr. No: 1 is the self-reported activity and the candidate activity phrase listed under Sr. No: 6 is the referred activity.

At step 208 of the method 200, the one or more hardware processors 104 of the system 100 are configured to identify a set of context tokens for each candidate activity phrase. The set of context tokens brings the contextual information for the candidate activity phrase. In an embodiment, the set of context tokens for each candidate activity phrase includes associated left context tokens and associated right context tokens. In an embodiment, the associated left context tokens are a predefined number of words present immediately left to the associated candidate activity phrase of a sentence present in the pre-processed input text. In an embodiment, the associated right context tokens are the predefined number of words present immediately right to the associated candidate activity phrase of the sentence present in the pre-processed input text. In an embodiment, number of associated left context tokens and number of associated right context tokens are equal. Below table.2 shows the set of context tokens including the associated left context tokens and the associated right context tokens, for each candidate activity phrase, with the predefined number of words present in the pre-processed input text equals to 3. If actual number of words present immediately right or immediately left to the associated candidate activity phrase of the sentence is less than the predefined number of words, then the actual number of words are considered along with null strings. If no words present immediately right or immediately left to the associated candidate activity phrase of the sentence, then null strings are considered.

TABLE 2

| Sr. No | Candidate activity phrase | Set of context tokens | |
| --- | --- | --- | --- |
| | | Associated left context tokens | Associated right context tokens |
| 1 | Checking lunch time on monitor | (null) | then will have |
| 2 | have a cigarette | monitor then will | (null) |
| 3 | complete a few works | After that will | (null) |
| 4 | have smoking session | Meanwhile | (null) |
| 5 | to try out idea | Planning | I thought of |
| 6 | good results | will give me | (null) |
| 7 | plan to twitter bootstrap defaults | Evening I | and to play |
| 8 | to play a completely new instrument | bootstrap defaults and | yay |
| 9 | want to date women my own age | Also I | very soon happy |
| 10 | my own age | to date women | very soon happy |

At step 210 of the method 200, the one or more hardware processors 104 of the system 100 are configured to obtain an associated activity phrase tokens array for each candidate activity phrase and an associated context tokens array for each candidate activity phrase, using a supervised classification model 300. In an embodiment, the supervised classification model 300 is a deep learning neural network model. FIG. 3 is a functional block diagram of a supervised classification model 300 for automatic extraction of the self-reported activities of the individual, according to some embodiments of the present disclosure. In an embodiment, the supervised classification model 300 includes a first embedding layer 302, a second embedding layer 304, a first Bi-directional long short-term memory (Bi-LSTM) layer 306, a second Bi-directional long short-term memory (Bi-LSTM) layer 308, a recurrent neural network (RNN) 310, and an output layer 312.

In an embodiment, the supervised classification model 300 is trained using a dataset including 11427 annotated candidate activity phrases. Out of 11427 annotated candidate activity phrases, 4235 are self-reported activities and rest 7192 are either referred activities or no activities. The dataset is created using a publicly available databases such as Happy DB, Twitter database and so on and applied the predefined grammar pattern on the posted text of the mentioned publicly available databases and obtained around 40,000 candidate activity phrases. Out of 40,000 candidate activity phrases, 11427 candidate activity phrases are annotated either with the self-reported activities or with the referred activities.

In an embodiment, the associated activity phrase tokens array for each candidate activity phrase is obtained by combining one or more activity phrase vectors, using the first embedding layer 302 of the supervised classification model 300. Each activity phrase vector of the one or more activity phrase vectors represents a word present in the associated candidate activity phrase. The first embedding layer 302 takes each candidate activity phrase as an input and produces a corresponding activity phrase vector for each word present in the associated candidate activity phrase. In an embodiment, each activity phrase vector is a 300*d* vector, where 'd' represents a length of the vector. Each word present in the associated candidate activity phrase may be represented in terms of 0s and 1s (binary numbers) in the corresponding 300*d* vector. A 2-D array having the 300*d* vectors for the words present in the candidate activity phrase, forms the associated activity phrase tokens array.

In an embodiment, the associated context tokens array for each candidate activity phrase, is obtained by combining one or more context vectors, using the second embedding layer 304 of the supervised classification model 300. Each context vector of the one or more context vectors, represent a context token of the set of context tokens of the associated candidate activity phrase. The second embedding layer 304 takes the set of context tokens for each candidate activity phrase, as an input and produces a corresponding context vector for each context token of the set of context tokens of the associated candidate activity phrase. In an embodiment, each context vector is a 300*d* vector, where 'd' represents a length of the vector. Each context token present in the associated context tokens array may be represented in terms of 0s and 1s (binary numbers) in the corresponding 300*d* vector. A 2-D array having the 300*d* vectors for the context tokens present in the set of context tokens for each candidate activity phrase, forms the associated context tokens array.

At step 212 of the method 200, the one or more hardware processors 104 of the system 100 are configured to determine a relation between the associated activity phrase tokens array and the associated context tokens array for each candidate activity phrase, using the supervised classification model 300. In an embodiment, the relation is determined based on an activity phrase grammar-pattern of the associated activity phrase tokens array and a context grammar-pattern of the associated context tokens array.

In an embodiment, the one or more hardware processors 104 of the system 100 are further configured to determine the activity phrase grammar-pattern of each activity phrase tokens array by analyzing a relationship and grammar between the words present in the associated candidate activity phrase, using the supervised classification model 300. In an embodiment, the first Bi-directional long short-term memory (LSTM) layer 306 of the supervised classification model 300, is used to process the 300*d* vectors of the associated activity phrase tokens array, to understand the grammar-pattern of the associated candidate activity phrase. In an embodiment, the first Bi-LSTM layer 306 includes 64 nodes, where each node outputs a learned weight for each candidate activity phrase. Thus, the first Bi-LSTM layer 306 calculates K*64 learned weight vector, where K represents a number of candidate activity phrases or a number of activity phrase tokens arrays. In an embodiment a dropout is applied on the calculated K*64 learned weight vector, with a rate of 0.3 to generate a final learned weights.

In an embodiment, the one or more hardware processors 104 of the system 100 are further configured to determine the context grammar-pattern of each context tokens array, by analyzing the relationship and grammar between the set of context tokens of the associated candidate activity phrase, using the supervised classification model 300. In an embodiment, the second bi-directional long short-term memory (LSTM) layer 308 of the supervised classification model 300, is used to process the 300*d* vectors of the associated context tokens array, to understand the grammar-pattern of the associated context tokens array. In an embodiment, the second Bi-LSTM layer 308 includes 64 nodes, where each node outputs a learned weight for each context tokens array. Thus, the second Bi-LSTM layer 308 calculates M*64 learned weight vector, where M represents a number of context tokens arrays. In an embodiment a dropout is applied on the calculated M*64 learned weight vector, with a learning rate of 0.3 to generate a final learned weights.

At step 214 of the method 200, the one or more hardware processors 104 of the system 100 are configured to classify each candidate activity phrase of the one or more candidate activity phrases as either a self-reported activity or a referred activity, using the supervised classification model 300, based on the determined relation. In an embodiment, the associated activity phrase tokens array and the associated context tokens array for each candidate activity phrase are concatenated and presented to the recurrent neural network (RNN) 310 of the supervised classification model 300. In an embodiment, the RNN 310 includes a 32 nodes which are used to understand the determined relation between the associated activity phrase tokens array and the associated context tokens array for each candidate activity phrase. Each neuron of the RNN 310 learns a weight for each candidate activity phrase based on the associated determined relation.

In an embodiment, the RNN 310 takes P*128 vector as input and outputs the P*32 vector, when the RNN 310 learns P number of candidate activity phrases. That means the RNN 310 outputs a 32-weight vector for each candidate activity phrases. The RNN 310 classifies each candidate activity phrase as either the self-reported activity or the referred activity, based on the learned weight (from 32-weight vector) for that associated candidate activity phrase. In other words, the RNN 310 classifies each candidate activity phrase as a activity type including either the self-reported activity or the referred activity, based on sequence of words present in the first embedding layer 302 (associated activity phrase tokens array), complex grammar of the associated candidate activity phrase from the first Bi-LSTM layer 306, and determined relation of associated activity phrase tokens array with the associated context tokens array present at the second embedding layer 304 and the complex grammar of the associated context tokens array from the second Bi-LSTM layer 308.

TABLE 3

| Sr. No | Candidate activity phrase | Activity type classification |
|---|---|---|
| 1 | Checking lunch time on monitor | self-reported activity |
| 2 | have a cigarette | self-reported activity |
| 3 | complete a few works | self-reported activity |
| 4 | have smoking session | self-reported activity |
| 5 | To try out idea | self-reported activity |
| 6 | good results | referred activity |
| 7 | plan to twitter bootstrap defaults | self-reported activity |
| 8 | to play a completely new instrument | self-reported activity |
| 9 | want to date women my own age | self-reported activity |
| 10 | my own age | Not an activity |

Table.3 shows the generated candidate activity phrases for the above mentioned exemplary pre-processed input text and the classification including the activity type for each candidate activity phrase. For example, 'Checking lunch time on monitor' is classified as the self-reported activity as it indicates the action that is performing by the individual. Similarly, the activity 'good results' is classified as the referred activity as it is indicating the outcome of some activity. Sometimes, the supervised classification model 300 may classify candidate activity phrase as neither the self-reported activity nor the referred activity. This activity will be normally not the activity at all. For example, the candidate activity phrase 'my own age' is not the activity at all as it is not indicating any action to be performed or already performed by the individual, and it is not indicating any outcome or result of any activity. Such candidate activity phrase are ignored during the classification by the supervised classification model 300.

At step 216 of the method 200, the one or more hardware processors 104 of the system 100 are further configured to automatically extract the one or more self-reported activities of the individual based on the classification.

In an embodiment, the one or more hardware processors 104 of the system 100 are further configured to predict a final classification for candidate activity phrase, using the supervised classification model 300. In an embodiment, the output layer 312 of the supervised classification model 300 is used to predict the final classification for each candidate activity phrase. In an embodiment, the output layer 312 may be a sigmoid layer which takes the associated 32-weight vector generated by the RNN 310 at step of 214 of the method 200 for the associated candidate activity phrase, as input and outputs the final classification. The final classification of the associated candidate activity phrase predicted at step 216 of the method 200, is compared with the classification of the associated candidate activity phrase at step 214 of the method, to determine a loss which is then backpropagated to learn better weights for the next batch of candidate activity phrases for the classification.

In an embodiment, the one or more hardware processors 104 of the system 100 are further configured to store the extracted one or more self-reported activities in a candidate database, at predefined storing intervals. In an embodiment, the candidate database may be present in the repository 1026 of the system 100. In one embodiment, the predefined storing interval may be same as that of the predefined intervals mentioned at step 202 of the method 200. In another embodiment, the predefined storing interval may be greater as that of the predefined intervals mentioned at step 202 of the method 200.

In an embodiment, the one or more hardware processors 104 of the system 100 are further configured to analyze the extracted one or more self-reported activities present in the candidate database, periodically, for assessing the insights of the individual.

In the embodiment of the present disclosure, the methods and systems for automatic extraction of self-reported activities of the individual, reduces the time required to extract the self-reported activities automatically. Manual intervention and efforts of analyzing the freestyle narrative text to extract the self-reported activities are avoided and human errors while extracting the self-reported activities are eliminated. Also, longitudinal assessment of the such self-reported activities stored in the candidate database, may reveal routines and behavior of the individual. This assessment may further help to discover physical or mental health problems such as stress, imbalanced life-style, bad health conditions, poor habits and preferences, and so on of the individual. Further, these assessments may help to improve life-style and well-being of the individual by taking appropriate measures.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for automatic extraction of self-reported activities of an individual, the method comprising steps of:
continuously obtaining, via one or more hardware processors, a self-reported input text of the individual, from one or more entities, at predefined intervals;
pre-processing, via the one or more hardware processors, the self-reported input text to obtain a pre-processed input text;
generating, via the one or more hardware processors, one or more candidate activity phrases, in each sentence from the pre-processed input text, based on a pre-defined grammar pattern, using a natural language processing technique, wherein each candidate activity phrase of the one or more candidate activity phrases, comprises one or more words present consecutively in the pre-processed input text;
identifying, via the one or more hardware processors, a set of context tokens for each candidate activity phrase, wherein the set of context tokens comprises associated left context tokens and associated right context tokens, wherein the associated left context tokens are a predefined number of words present immediately left to the associated candidate activity phrase of a sentence present in the pre-processed input text, and wherein the associated right context tokens are the predefined number of words present immediately right to the associated candidate activity phrase of the sentence present in the pre-processed input text;
obtaining, via the one or more hardware processors, an associated activity phrase tokens array for each candidate activity phrase and an associated context tokens array for each candidate activity phrase, using a supervised classification model, wherein the associated activity phrase tokens array for each candidate activity phrase, is obtained by combining one or more activity phrase vectors, wherein each activity phrase vector of the one or more activity phrase vectors, represent a word present in the associated candidate activity phrase, wherein the associated context tokens array for each candidate activity phrase, is obtained by combining one or more context vectors, using the supervised classification model, wherein each context vector of the one or more context vectors, represent a context token of the set of context tokens of the associated candidate activity phrase;
determining, via the one or more hardware processors, a relation between the associated activity phrase tokens array and the associated context tokens array for each candidate activity phrase, using the supervised classification model, wherein the relation is determined based on an activity phrase grammar-pattern of the associated activity phrase tokens array and a context grammar-pattern of the associated context tokens array;
classifying, via the one or more hardware processors, each candidate activity phrase of the one or more candidate activity phrases, as a self-reported activity or a referred activity, using the supervised classification model, based on the determined relation; and
automatically extracting, via the one or more hardware processors, the one or more self-reported activities of the individual, using the supervised classification model, based on the classification.

2. The method as claimed in claim 1, further comprising storing the extracted one or more self-reported activities in a candidate database, via the one or more hardware processors, at predefined storing intervals.

3. The method as claimed in claim 1, wherein the self-reported input text is obtained, via the one or more hardware processors, by combining one or more input text instances posted by the individual in the one or more entities.

4. The method as claimed in claim 1, wherein the step of pre-processing comprises:
removing one or more special characters present in the self-reported input text; and
handling one or more characteristics associated with one or more words present in the self-reported input text.

5. The method as claimed in claim 1, wherein the predefined grammar pattern is constructed based on part-of-speech tagging (POSTAG) sub-patterns denoting a context and a definition of each word present in a sentence having a combination of one or more verbs, adverbs, nouns, adjectives and prepositions.

6. The method as claimed in claim 1, wherein the step of generating the one or more candidate activity phrases, from the pre-processed input text, comprises:
identifying one or more candidate words denoting one of verbs, adverbs, nouns, adjectives and prepositions, present in the pre-processed input text, using the natural language processing technique; and
generating the one or more candidate activity phrases from the pre-processed input text, based on the predefined grammar pattern, wherein each candidate activity phrase of the one or more candidate activity phrases comprises the identified one or more candidate words.

7. The method as claimed in claim 1, wherein:
the activity phrase grammar-pattern of each activity phrase tokens array, is determined by analyzing the words present in the associated candidate activity phrase, using the supervised classification model; and
the context grammar-pattern of each context tokens array, is determined by analyzing the set of context tokens of the associated candidate activity phrase, using the supervised classification model.

8. A system for automatic extraction of self-reported activities of an individual, the system comprising:
a memory storing instructions;
one or more communication interfaces; and
one or more hardware processors coupled to the memory via the one or more communication interfaces, wherein the one or more hardware processors are configured by the instructions to:
continuously obtain a self-reported input text of the individual, from one or more entities, at predefined intervals;
pre-process the self-reported input text to obtain a pre-processed input text;
generate one or more candidate activity phrases, in each sentence from the pre-processed input text, based on a predefined grammar pattern, using a natural language processing technique, wherein each candidate activity phrase of the one or more candidate activity phrases, comprises one or more words present consecutively in the pre-processed input text;
identify a set of context tokens for each candidate activity phrase, wherein the set of context tokens comprises associated left context tokens and associated right context tokens, wherein the associated left context tokens are a predefined number of words present immediately left to the associated candidate activity phrase of a sentence present in the pre-processed input text, and wherein the associated right context tokens are the predefined number of words present immediately right to the associated candidate activity phrase of the sentence present in the pre-processed input text;
obtain an associated activity phrase tokens array for each candidate activity phrase and an associated context tokens array for each candidate activity phrase, using a supervised classification model, wherein the associated activity phrase tokens array for each candidate activity phrase, is obtained by combining one or more activity phrase vectors, wherein each activity phrase vector of the one or more activity phrase vectors, represent a word present in the associated candidate activity phrase, wherein the associated context tokens array for each candidate activity phrase, is obtained by combining one or more context vectors, using the supervised classification model, wherein each context vector of the one or more context vectors, represent a context token of the set of context tokens of the associated candidate activity phrase;
determine a relation between the associated activity phrase tokens array and the associated context tokens array for each candidate activity phrase, using the supervised classification model, wherein the relation is determined based on an activity phrase grammar-pattern of the associated activity phrase tokens array and a context grammar-pattern of the associated context tokens array;
classify each candidate activity phrase of the one or more candidate activity phrases, as a self-reported activity or a referred activity, using the supervised classification model, based on the determined relation; and
automatically extract the one or more self-reported activities of the individual, using the supervised classification model, based on the classification.

9. The system as claimed in claim 8, wherein the one or more hardware processors are further configured by the instructions to store the extracted one or more self-reported activities in a candidate database, at predefined storing intervals.

10. The system as claimed in claim 8, wherein the one or more hardware processors are further configured by the instructions to obtain the self-reported input text, by combining one or more input text instances posted by the individual in the one or more entities.

11. The system as claimed in claim 8, wherein the one or more hardware processors are further configured by the instructions to pre-process the self-reported input text to obtain the pre-processed input text, by performing:
removing one or more special characters present in the self-reported input text; and
handling one or more characteristics associated with one or more words present in the self-reported input text.

12. The system as claimed in claim 8, wherein the one or more hardware processors are further configured by the instructions to construct the predefined grammar pattern, based on part-of-speech tagging (POSTAG) sub-patterns denoting a context and a definition of each word present in a sentence having a combination of one or more verbs, adverbs, nouns, adjectives and prepositions.

13. The system as claimed in claim 8, wherein the one or more hardware processors are further configured by the instructions to generate the one or more candidate activity phrases from the pre-processed input text, by:

identifying one or more candidate words denoting one of verbs, adverbs, nouns, adjectives and prepositions, present in the pre-processed input text, using the natural language processing technique; and generating the one or more candidate activity phrases from the pre-processed input text, based on the predefined grammar pattern, wherein each candidate activity phrase of the one or more candidate activity phrases comprises the identified one or more candidate words.

14. The system as claimed in claim 8, wherein the one or more hardware processors are further configured by the instructions to:

determine the activity phrase grammar-pattern of each activity phrase tokens array, by analyzing the words present in the associated candidate activity phrase, using the supervised classification model; and determine the context grammar-pattern of each context tokens array, by analyzing the set of context tokens of the associated candidate activity phrase, using the supervised classification model.

15. A computer program product comprising a non-transitory computer readable medium having a computer readable program embodied therein, wherein the computer readable program, when executed on a computing device, causes the computing device to:

continuously obtain a self-reported input text of the individual, from one or more entities, at predefined intervals;

pre-process the self-reported input text to obtain a pre-processed input text;

generate one or more candidate activity phrases, in each sentence from the pre-processed input text, based on a predefined grammar pattern, using a natural language processing technique, wherein each candidate activity phrase of the one or more candidate activity phrases, comprises one or more words present consecutively in the pre-processed input text;

identify a set of context tokens for each candidate activity phrase, wherein the set of context tokens comprises associated left context tokens and associated right context tokens, wherein the associated left context tokens are a predefined number of words present immediately left to the associated candidate activity phrase of a sentence present in the pre-processed input text, and wherein the associated right context tokens are the predefined number of words present immediately right to the associated candidate activity phrase of the sentence present in the pre-processed input text;

obtain an associated activity phrase tokens array for each candidate activity phrase and an associated context tokens array for each candidate activity phrase, using a supervised classification model, wherein the associated activity phrase tokens array for each candidate activity phrase, is obtained by combining one or more activity phrase vectors, wherein each activity phrase vector of the one or more activity phrase vectors, represent a word present in the associated candidate activity phrase, wherein the associated context tokens array for each candidate activity phrase, is obtained by combining one or more context vectors, using the supervised classification model, wherein each context vector of the one or more context vectors, represent a context token of the set of context tokens of the associated candidate activity phrase;

determine a relation between the associated activity phrase tokens array and the associated context tokens array for each candidate activity phrase, using the supervised classification model, wherein the relation is determined based on an activity phrase grammar-pattern of the associated activity phrase tokens array and a context grammar-pattern of the associated context tokens array;

classify each candidate activity phrase of the one or more candidate activity phrases, as a self-reported activity or a referred activity, using the supervised classification model, based on the determined relation; and automatically extract the one or more self-reported activities of the individual, using the supervised classification model, based on the classification.

\* \* \* \* \*